Nov. 25, 1930.   F. WŁODARSKI   1,782,834
APPARATUS FOR RENDERING DISPLAYS VISIBLE FROM ALL SIDES
Filed Aug. 10, 1928   2 Sheets-Sheet 1
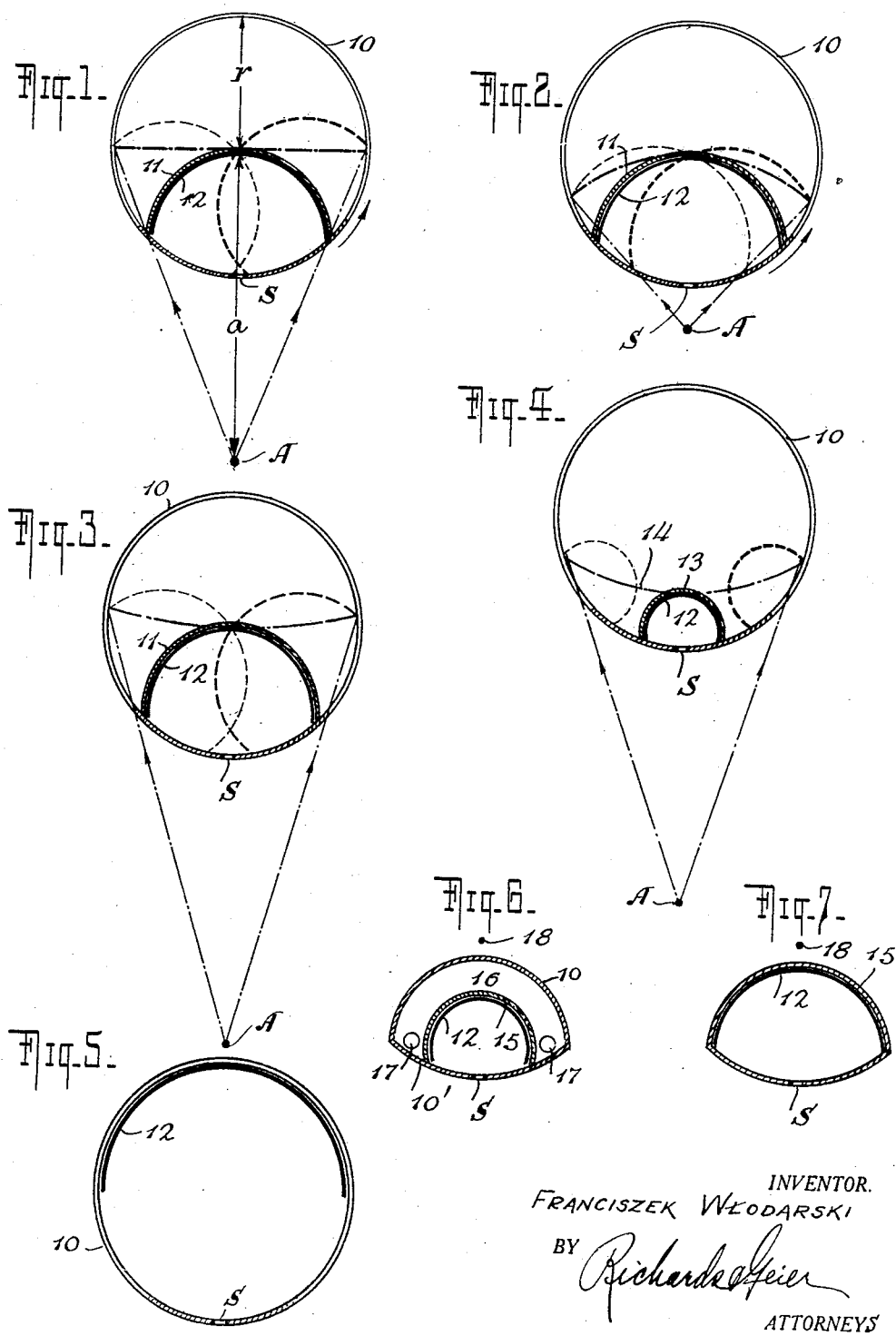
INVENTOR.
FRANCISZEK WŁODARSKI
BY
ATTORNEYS Nov. 25, 1930.  F. WŁODARSKI  1,782,834
APPARATUS FOR RENDERING DISPLAYS VISIBLE FROM ALL SIDES
Filed Aug. 10, 1928  2 Sheets-Sheet 2
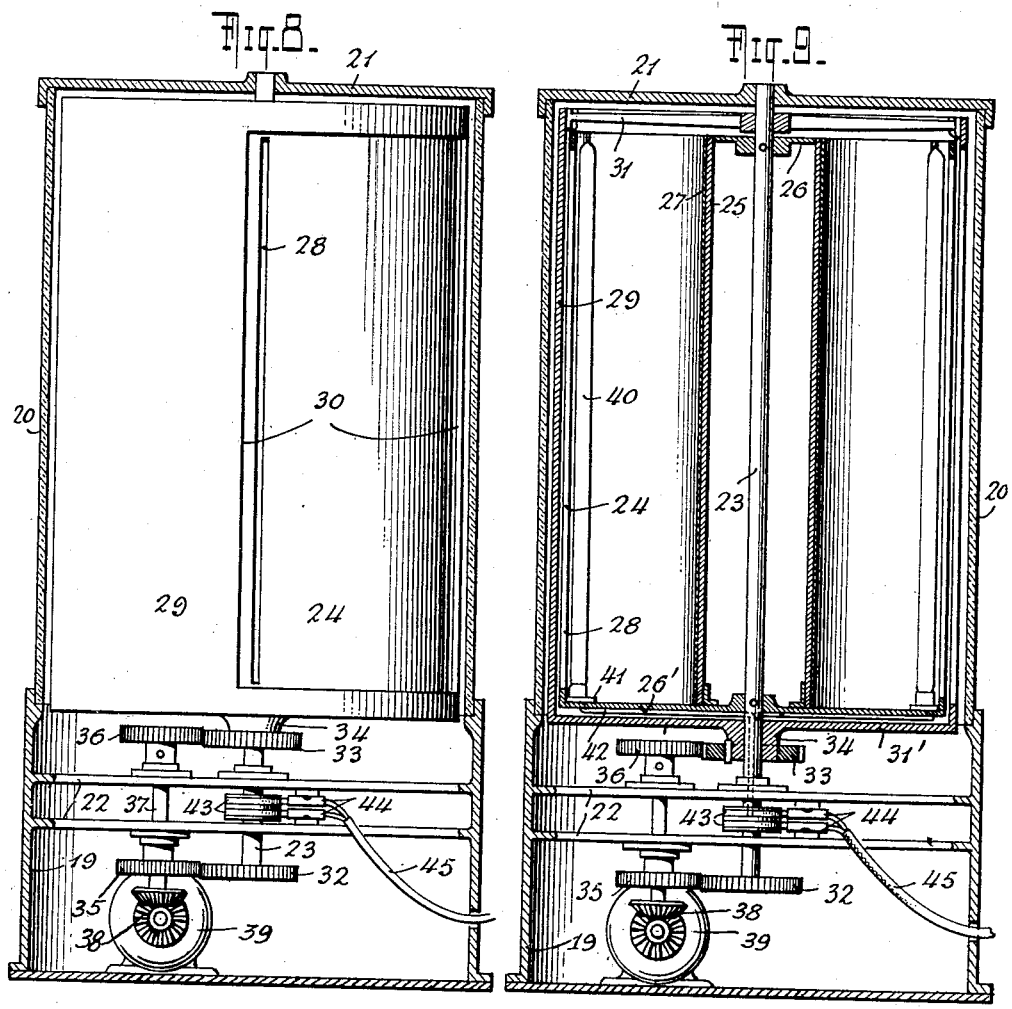
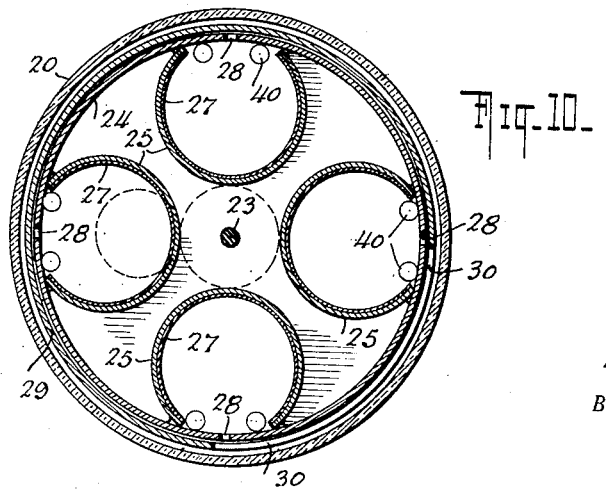
INVENTOR.
FRANCISZEK WŁODARSKI
BY
ATTORNEYS Patented Nov. 25, 1930

1,782,834

UNITED STATES PATENT OFFICE

FRANCISZEK WŁODARSKI, OF POZNAN, POLAND

APPARATUS FOR RENDERING DISPLAYS VISIBLE FROM ALL SIDES

Application filed August 10, 1928, Serial No. 298,813, and in Poland October 31, 1927.

My invention relates to apparatus for rendering displays visible from all sides and has particular utility in the field of advertising as advertising matter displayed by my apparatus is made visible to all observers no matter what their position with respect to said apparatus.

It is an object of the present invention to provide an advertising or display device which is capable of presenting a clear image to all observers regardless of their position.

It is a further object of my invention to provide an apparatus for displaying advertising or other matter in a novel and interesting manner calculated to catch the eye and hold the attention of observers.

A still further object of the invention is to provide an apparatus of the above described character which is simple in construction, inexpensive to manufacture and effective and reliable in operation.

In one of its forms my invention embodies a support for a picture or printed or other matter which is rotatable about a fixed axis, the picture being covered by a preferably black plate spaced therefrom and provided with an aperture or slit equal in length to the height or width of the picture, so that successive portions or bands of said picture will be seen through said slit at successive angular positions of the apparatus.

The picture is illuminated and is rotated with its cover plate at a speed greater than the maximum speed at which distinct separate images can be perceived by the human eye, so that a complete, continuous and clear image is impressed upon the retina of the eye of the observer no matter from what position he views the apparatus.

A plurality of illuminated pictures or cards may in accordance with my invention be positioned about a fixed axis for rotation thereabout, each of the pictures being covered except for a narrow slit, means being in such case provided for exposing said slits one at a time and in sequence, whereby said pictures or cards become visible to an observer in sequence for predetermined intervals.

A further object of my invention is to provide a display device which is so constructed that not only is the picture or other advertising matter visible from all sides, but the background thereof is rendered invisible, so that the picture appears to be suspended in air.

Other objects and advantages of my invention will appear more fully from the following description and the features of novelty will be pointed out in the appended claims.

In the accompanying drawings which show by way of example several forms of my invention without defining its limits, Fig. 1 shows diagrammatically a display device in accordance with my invention, the middle position of the display card being shown in full lines and the end positions thereof in dotted lines in order to illustrate the development of the image for an observer who is so positioned that the image appears to be in a plane; Figs. 2 and 3 are views similar to Fig. 1 but showing the development of the image for observers who are, respectively, close to or distant from the display device; Figs. 4 and 5 illustrate diagrammatically two modifications of my invention; Figs. 6 and 7 show two further modifications wherein the background or support of the picture is rendered invisible in the operation of the device; Fig. 8 is an elevation partly in vertical section through an apparatus designed to display four display cards in sequence; Fig. 9 is a vertical sectional view; Fig. 10 is a horitontal section of the apparatus shown in Fig. 8.

Referring to Fig. 1, the numeral 10 indicates a hollow cylinder having, preferably, a black exterior surface and mounted to rotate about its own axis. Positioned within the cylinder and passing through its axis and rigidly attached thereto so as to rotate therewith is a card or picture support 11. This support may be in the form of a curved segment or plate (for example, a section of a cylinder) which is adapted to support upon its inner surface a display card or picture 12; or it may be in the form of a frame having means for engaging and holding the edges of such card or picture in position. The card or picture is illuminated in any desired way, either from the interior of the segment in the manner described more fully below in connection with Figs. 8 and 10, or from the exterior of the display apparatus.

The portion of the cylinder 10 lying opposite the card 12 is provided with a slit or aperture S located preferably centrally of such portion and extending through the height of the card. It will be clear that as the position of the support 11 continuously changes during rotation of the cylinder 10, successive vertical portions or bands of the card will become visible, and the eye of an observer stationed, say at A, will thus sweep the whole card or picture through the slit S. If now the cylinder 10 is at such speed that the slit S comes to view with greater frequency than the human eye is able to receive separate distinct images (i. e. about 10 times per second or higher), the observer, no matter what his position about the apparatus may be, will see the card as a complete and continuous whole and the illusion will be created for each observer that the card is stationary and completely unsupported and uncovered.

Depending upon the distance of the observer from the apparatus, the surface of the card being suitably curved, the image will appear plane, concave or convex. In general, the concavity or convexity will be so slight as hardly to be noticeable, though if desired such distortion may be increased in order to obtain novel effects. It will be apparent from Fig. 1 that if the observer is positioned at such a distance from the display device that the portions or bands of the card which are visible through the slit S at the extreme limits of visibility (indicated by the two dotted positions of the segment 11) are in line with the central portion or band of said card when the latter is in its mid-position (indicated by the full-line position of the segment 11 in Fig. 1) the image will appear to an observer to be in a plane. If the observer is located nearer to the apparatus, as shown in Fig. 2, the portions of the card which are visible at the extreme limits of visibility will lie forwardly of the central portion or band of said card when the latter is in its mid-position, the intermediate portions of bands taking intermediate positions, and the image will appear slightly concave; while if the observer is located farther from the apparatus (Fig. 3) the portions of the card visible at the extreme limits of visibility will be rearwardly of such central portion and the image will appear slightly convex.

The shape or curve that the segment 11 must have, in order that the image of the display card may be made to appear to lie in a flat plane to observers positioned at a certain definite distance from the apparatus, can be readily determined. Theoretically it may be said that each half of the segment 11 lies along an arc of the curve which may be represented by the following polar equation:

$$\rho = \frac{ar \sin \theta}{a - r \cos \theta}$$

where $\rho$ and $\theta$ are the polar coordinates, $r$ is the radius of cylinder 10, and $a$ is the distance of the observer from the center of the cylinder 10, as shown in Fig. 1.

From the practical standpoint, the arc represented by this equation is so little different from the arc of a true circle that the latter may be substituted therefor without producing any appreciable distortion.

The card 12 need not lie along a curve which passes through the axis of the outer cylinder as shown in Figs. 1–3. Fig. 4 shows a different embodiment of my invention wherein the curved surface 13 along which the card lies does not pass through the axis of cylinder 10. Upon rotation of the cylinder 10 about its axis the card will appear to all observers located at the distance A from the device to lie along a surface having the form of the developed line 14. In this case the image will appear to be much wider than the actual card or picture.

Fig. 5 shows a modification in which the card or picture is supported upon the interior surface of the cylinder 10, the latter being made to revolve about its own axis.

In Figs. 6 and 7 there are illustrated diagrammatically two embodiments of my invention which in operation will produce the effect of a picture or sign suspended in space, the support or background of the picture being rendered invisible while objects behind the apparatus are visible. In Fig. 6, 10 represents a curved segment which is opaque and preferably black on its outer surface. This segment 10 may comprise a whole cylinder, or it may form only part of a cylinder, in which case a second opaque, externally black segment or surface 10' (which may be curved or plane) is connected thereto to form a hollow casing. Suitably supported within the casing is a segment or plate 15. This segment 15 either consists in part of a transparent picture 12, or has letters or signs cut out in the body thereof the remainder being opaque and preferably black. The picture or sign to be displayed is thus transparent while the rest of the segment 15 is black and opaque. The casing or the plate 10 is provided with a slit S in front of the picture and the space 16 is illuminated by means of a lamp or lamps 17 positioned therein. The apparatus is mounted so as to be rotatable about a fixed axis 18 which is external to said casing. If the apparatus is rotated about the axis 18 at a suitably high speed the picture or sign 12 will be visible from all sides and will appear to be suspended in space, while objects behind the apparatus with respect to any particular observer will be visible to him.

Fig. 7 shows a device similar to that shown in Fig. 6 with the exception that the external segment 10 is omitted and the signs or letters comprising the display are made up of electric lamps or luminous tubes, the rest of the segment 15 being black and opaque. Obviously phosphorescent or other luminous signs can be employed instead of electric lights.

In Figs. 8, 9, and 10, I illustrate an apparatus embodying some of the features of my invention described above and adapted to display a plurality of pictures or cards, in this case four, in sequence, each picture or card being simultaneously visible from all sides when the apparatus is in operation.

The numeral 19 indicates a rigid supporting framework upon which is mounted a cylinder 20 of transparent material, such as glass. The cylinder may support a top plate or spider 21 which is rigid therewith. The framework 19 includes two cross-bars 22 and passing through the latter and also through the top plate or spider 21 and rotatably supported thereby is a shaft 23 which is coincident with the axis of the cylinder 20. Fixed to the shaft 23 so as to rotate therewith is a cylinder 24 concentric with the cylinder 20 and preferably opaque and black on its exterior surface.

Within the cylinder 24 and preferably arranged symmetrically about the shaft 23 are a plurality of curved segments or cylinders 25 which are supported by top and bottom plates 26 and 26′ fixed to the shaft 23. The cylinder 24, segments or cylinder 25, plates 26, and shaft 23 thus rotate together. Mounted in any suitable way upon the inner faces of the segments or cylinders 25 are pictures or display cards 27. The cylinder 24 is provided with narrow apertures or slits 28, one in front of each segment 25 so that the pictures 27 can be viewed therethrough in successive bands or portions as the shaft rotates.

In order to expose only one slit 28 at a time so that only one picture can be seen at any given moment and blending or overlapping of the images avoided, a shutter is provided in the form of a preferably black opaque cylinder 29 which surrounds the cylinder 24 and is loosely mounted about the shaft 23 so as to be capable of rotating relatively to the cylinder 24 and is provided with a wide aperture or slit 30 of substantially the same height as the slits 28. The width of the slit 30 will depend upon the number of pictures to be displayed and will in general be so proportioned as to be capable of exposing only one of the slits 28 at a time as the cylinder 29 moves relative to the cylinder 24. In the present instance the slit 30 extends through an arc of about 90° or very slightly less than 90°.

The shutter cylinder 29 is loosely supported upon the shaft 23 in any desired way as by means of cross-bars or plates 31 and 31′, which engage suitable abutments or collars fixed to the shaft. It will be understood that the cylinder 24 with the display cards 27 positioned therein are to be rotated at high speed as explained above in connection with Figs. 1–7, in order to produce the illusion of a complete and continuous image upon the eye. Relative movement between the cylinders 24 and 29 may be obtained by means of the following mechanism: A gear 32 is fixed on the shaft 23 while a gear 33 is rigidly mounted upon a hub or sleeve 34 connected to the cylinder 29 and loosely surrounding the said shaft. Meshing respectively with the gears 32 and 33 are gears 35 and 36 fixed to a shaft 37 journalled in the cross-bars 22. The shaft 37 has a bevel gear 38 thereon which is operated by means of a similar gear on the armature shaft of a motor 39.

The cylinder 24 must be rotated at a speed of at least 600 R. P. M. in order to produce clear images upon the eye of an observer. If this cylinder is rotated at this speed and it is desired that each card be visible for about 20 seconds, and then give up its place to the next card in sequence, then the cylinder 29 must be rotated at either 599¼ or 600¾ R. P. M. During the time therefore that the cylinder 24 rotates through one revolution, the cylinder 29 must rotate through either $$\frac{799}{800}$$

or $$1 - \frac{1}{800}$$

revolutions. This small differential in the speed of the two cylinders may be obtained by suitably proportioning the gears 32, 33, 35 and 36. For example, the gear 32 rigid with the cylinder 24 may have 29 teeth; the gear 33 fixed to the cylinder 29 may have 28 teeth, and the gears 35 and 36 may have 28 and 27 teeth respectively. If now the shaft 37 is rotated once, the cylinder 24 will rotate $$\frac{28}{29} \text{ths}$$

of a revolution, while the cylinder 29 will rotate $$\frac{27}{28} \text{ths}$$

of a revolution. Consequently, if the cylinder 24 is rotated at 600 R. P. M., each picture or card will be visible for about 19.6 seconds.

An apparatus, for the production of a plurality of images visible in sequence and from all sides, may also be constructed in other ways. For example, a mechanism can be positioned in the interior of the cylinder 10 of Fig. 1 which so shifts or rotates a band which contains the pictures or cards that each of the latter assumes the position of the segment 11 (Fig. 1) for a definite time interval, after which the band is shifted, and the picture gives up its place to the next picture in rotation.

The nature of the curve of the segments 25 which will produce the illusion of a flat planar picture to the eye of an observer at a certain distance from the axis or shaft 23 can readily be determined mathematically. It will be found that this curve or arc is so near that of a circle that the segments may be made curved along the arc of a circle without producing any noticeable distortion.

The pictures or cards 27 may be illuminated in any desired way, either from the exterior or the interior of the cylinder 24. In the apparatus shown in Figs. 8–10, the pictures are illuminated from the interior of the cylinder 24 by means of lamps 40 positioned in sockets 41 supported upon the plate 26 and connected by means of cables 42 to a pair of rings 43 which are connected to a source of electric current by means of brushes 44 and cable 45.

In the operation of the device, the lamps are turned on and the shaft 23 rotated at a speed of about 600 R. P. M. by the motor 39. To any observer, no matter where he is positioned, there will appear the four pictures or cards in rotational sequence each picture being visible for a definite time interval, in this case about 19.6 seconds. To an observer positioned at a certain predeterminable distance from the shaft 23, the pictures will appear flat and planar, while to observers located nearer to or farther from said shaft they will appear slightly concave or convex.

It will be obvious that in all of the above described embodiments of my invention the card may be positioned within any kind of hollow casing and that such casing need not be a circular cylinder nor made up of segments or sections of circular cylinders. I therefore wish it to be understood that where in the claims I refer to "cylinder" and "cylinder segment", I mean to include thereby all forms of plates, plane or curved, either comprising or capable of being assembled to produce a hollow casing for the display card.

Where in the claims I employ the term "high speed", such term is to be understood to mean a speed equivalent to or higher than that which will produce the minimum frequency at which distinct and separate images can no longer be perceived by the human eye.

Numerous variations from the forms shown and described may be resorted to within the scope of the claims without departing from the spirit of the invention.

What is claimed is:

1. A display device for displaying in sequence a plurality of display cards so that each will be simultaneously visible from all sides of the device, comprising a plurality of cylinder segments fixed relatively to each other about an axis, each segment being adapted to support a display card upon its inner surface, means for illuminating the interiors of said segments, another cylinder segment rigidly connected to each of the first-named segments and having a black external surface, said other segments being each provided with a narrow slit, means for rotating all of said cylinder segments about said axis at high speed, a shutter adapted to expose one of said slits at a time, and mechanism for shifting said shutter relatively to said cylinder segments and to said slits whereby said slits are exposed one after the other and said cards become visible in sequence for predetermined intervals.

2. A display device for displaying in sequence a plurality of display cards so that each will be simultaneously visible from all sides of the device, comprising a plurality of cylinder segments fixed relatively to each other about an axis, each segment being adapted to support a display card upon its inner surface, means for illuminating the interiors of said segments, a cylinder having a black external surface surrounding said segments and rigidly connected thereto, and provided with a narrow slit in common with each of said segments, a second cylinder having a black external surface surrounding the first-mentioned cylinder and provided with a relatively wide slit, and means for rotating said cylinders at slightly different high speeds, whereby said narrow slits of said first cylinder come in succession into registry with the wide slit of said second cylinder and complete and continuous images of said cards are impressed in sequence for predetermined intervals upon the eye of an observer.

3. A display device for displaying in sequence a plurality of display cards so that each will be simultaneously visible from all sides of the device, comprising a plurality of cylinder segments fixed relatively to each other about a fixed shaft, each segment being adapted to support a display card upon its inner surface, means for illuminating the interior of said segments, a cylinder having a black external surface surrounding said segments and rigidly connected thereto, and provided with a narrow slit in common with each of said segments, said segments and cylinder being rigid with said shaft, a second cylinder having a black external surface surrounding said first mentioned cylinder, said second cylinder being loose on said shaft and provided with a relatively wide slit, and means for rotating said cylinders at slightly different high speeds whereby said narrow slits of said first cylinder come in succession into registry with the wide slit of said second cylinder and complete and continuous images of said cards are impressed in sequence for predetermined intervals upon the eye of an observer.

4. A display device for displaying in sequence a plurality of display cards so that each will be simultaneously visible from all sides of the device comprising a plurality of cylinder segments fixed relatively to each other about a fixed shaft, each segment being adapted to support a display card upon its inner surface, means for illuminating the interior of said segments, said means comprising lamps positioned within said segments and collector rings on said shaft and electrically connected to said lamps, a cylinder having a black external surface surrounding said segments and rigidly connected thereto and provided with a narrow slit in common with each of said segments, said segments and cylinder being rigid with said shaft, a second cylinder having a black external surface surrounding said first-mentioned cylinder, said second cylinder being loose on said shaft and provided with a relatively wide slit and means for rotating said cylinders at slightly different high speeds whereby said narrow slits of said first cylinder come in succession into registry with the wide slit of said second cylinder and complete and continuous images of said cards are impressed in sequence for predetermined intervals upon the eye of an observer.

5. A display device for displaying a plurality of cards so that each will be rendered visible from all sides of the device, comprising a plurality of card supports rotatable about a common axis, a cylinder rotatable with said supports and having a slit therein individual to each support, a shutter for exposing said slits one at a time, and means for rotating said cylinder and shutter at different speeds.

6. A display device for displaying a plurality of cards so that each will be rendered visible from all sides of the device, comprising a plurality of card supports rotatable about a common axis, a cylinder rotatable with said supports and having a slit therein individual to each support, a shutter for exposing said slits one at a time, said shutter having a relatively wide slit, and means to rotate said cylinder and shutter at slightly different speeds to successively bring the slits of the cylinder into registry with said wide slit for predetermined intervals.

7. A display device for displaying in sequence a plurality of display cards so that each will be simultaneously visible from all sides of the device, comprising a plurality of cylinder segments fixed relatively to each other about an axis, each segment being adapted to support a display card upon its inner surface, a cylinder surrounding said segments and rigidly connected thereto and provided with a narrow slit in common with each of said segments, a second cylinder surrounding the first-mentioned cylinder and provided with a relatively wide slit, and means for rotating said cylinders at slightly different high speeds, whereby said narrow slits of said first cylinder come in succession into registry with the wide slit of said second cylinder and complete and continuous images of said cards are impressed in sequence for predetermined intervals upon the eye of an observer.

8. A display device for displaying in sequence a plurality of display cards so that each will be simultaneously visible from all sides of the device, comprising a plurality of cylinder segments fixed relatively to each other about a fixed shaft, each segment being adapted to support a display card upon its inner surface, a cylinder surrounding said segments and rigidly connected thereto and provided with a narrow slit in common with each of said segments, said segments and cylinder being rigid with said shaft, a second cylinder surrounding said first-mentioned cylinder, said second cylinder being loose on said shaft and provided with a relatively wide slit, and means for rotating said cylinders at slightly different high speeds whereby said narrow slits of said first cylinder come in succession into registry with the wide slit of said second cylinder and complete and continuous images of said cards are impressed in sequence for predetermined intervals upon the eye of an observer.

9. A display device comprising a plurality of movable semi-cylindrical display card supports, means movable with said supports for covering the card of each in such manner that portions thereof are successively exposed to view in successive positions of its support, and means for moving said supports at high speed whereby a complete and continuous image of the card of each support is impressed upon the eye of an observer.

10. A display device comprising a plurality of movable semi-cylindrical display card supports, means movable with said supports for covering the card of each in such manner that portions thereof are successively exposed to view in successive positions of its support, means for moving said supports at high speed whereby a complete and continuous image of the card of each support is impressed upon the eye of an observer, and a shutter movable at a different speed from the first-named means to expose only one of said supports at a time and for a predetermined interval.

11. A display device comprising a rotatable support for a display card, said support being adapted to hold said card in a curved position, a curved cover plate associated with said support and fixed relatively thereto, said plate having a different curvature than said card and also having a single aperture therein whereby successive portions of said card are exposed to view in successive positions of said support, and means for rotating said support at a speed the frequency of which is greater than the maximum at which the eye of an observer is able to perceive separate distinct images, whereby a complete and continuous image of said card visible from all sides is impressed upon the eye.

In testimony whereof I have affixed my signature.

FRANCISZEK WŁODARSKI.